United States Patent [19]

Narkum et al.

[11] Patent Number: 5,169,367
[45] Date of Patent: Dec. 8, 1992

[54] CHAIN DRIVE SYSTEM FOR VEHICLES

[75] Inventors: John H. Narkum, Crown Point, Ind.; Rodney Eschenberg, San Diego, Calif.

[73] Assignee: National Racing Products, Inc., Milwaukee, Wis.

[21] Appl. No.: 791,723

[22] Filed: Nov. 14, 1991

[51] Int. Cl.⁵ .............................. F16H 7/08
[52] U.S. Cl. ........................ 474/101; 474/137
[58] Field of Search .............. 474/101, 109–111, 474/113, 116, 117, 133, 134, 136, 137, 84–88

[56] References Cited

U.S. PATENT DOCUMENTS

| | | |
|---|---|---|
| 649,689 | 5/1900 | Gay . |
| 1,168,934 | 1/1916 | Cook . |
| 1,331,980 | 2/1920 | Chowen .............................. 474/137 |
| 1,826,103 | 10/1931 | Trempe ............................ 474/137 X |
| 2,479,617 | 8/1949 | Hawley et al. . |
| 2,629,931 | 3/1953 | Brierley ............................. 474/88 X |
| 2,800,188 | 7/1957 | Garrett . |
| 2,873,656 | 2/1959 | Anderson . |
| 2,927,480 | 3/1960 | Schweickart . |
| 4,328,877 | 5/1982 | Ballard . |

Primary Examiner—Thuy M. Bui
Attorney, Agent, or Firm—Wheeler Law Firm

[57] ABSTRACT

A drive chain assembly for vehicles having two chains, an idler sprocket, and a thrust link or strut. The first chain extending from the vehicle motor to the idler sprocket. The second chain extending from the idler sprocket to a driven axle sprocket. The second chain extending downwardly at a substantial angle from the driven axle to the idler sprocket and the idler sprocket supported on a mounting member which pivots on the same axis as the driven axle itself. The thrust link is pivotally attached at one end to the chassis of the vehicle near the engine and at its other end to the mounting of the idler sprocket. This strut forms one of the long side of a parallelogram linkage. The first short side of the parallelogram linkage is the distance between the pivot point at the engine end on the chassis for the strut and the engine sprocket. The second long side of the parallelogram is the first drive chain itself. The second short side of the parallelogram linkage is the distance between the thrust link and the place where the first chain engages the intermediate or idler sprocket.

6 Claims, 2 Drawing Sheets

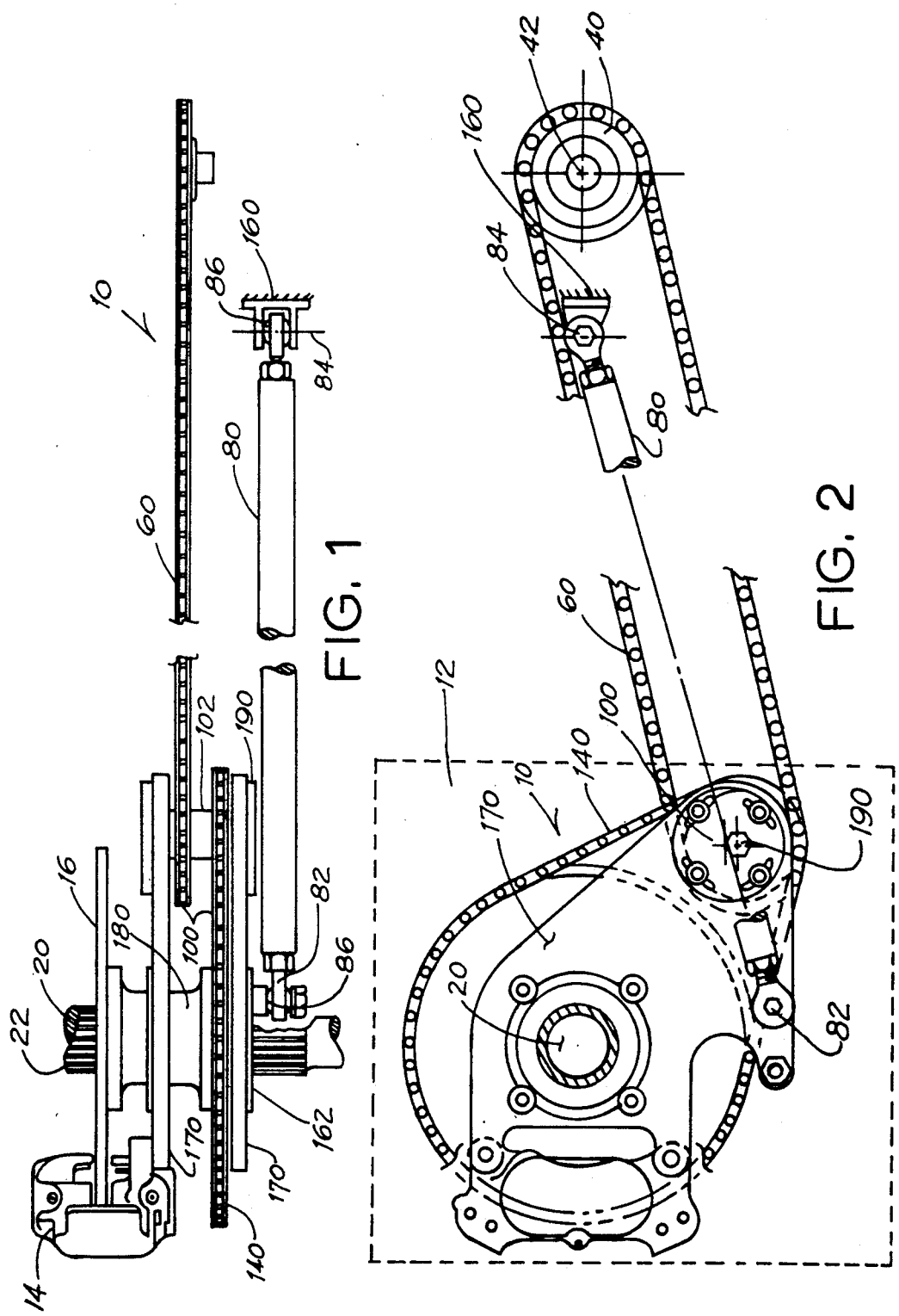

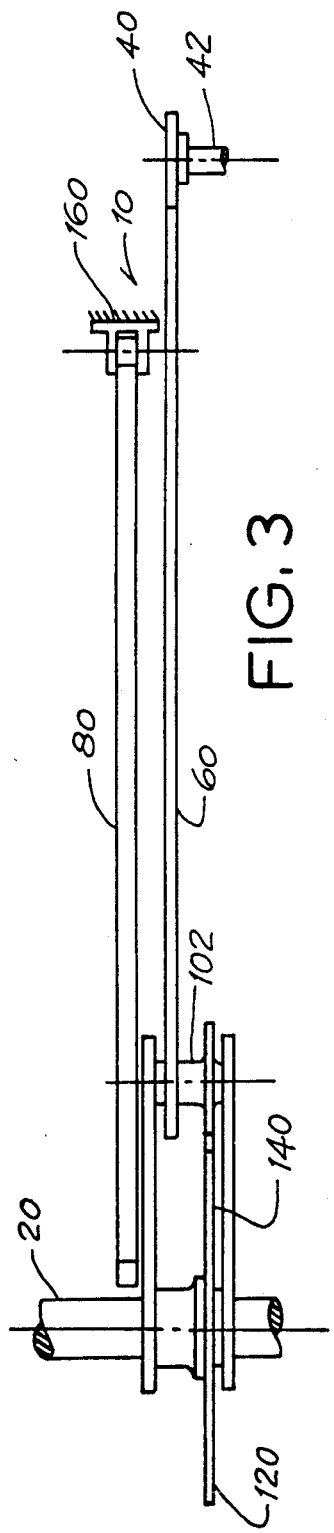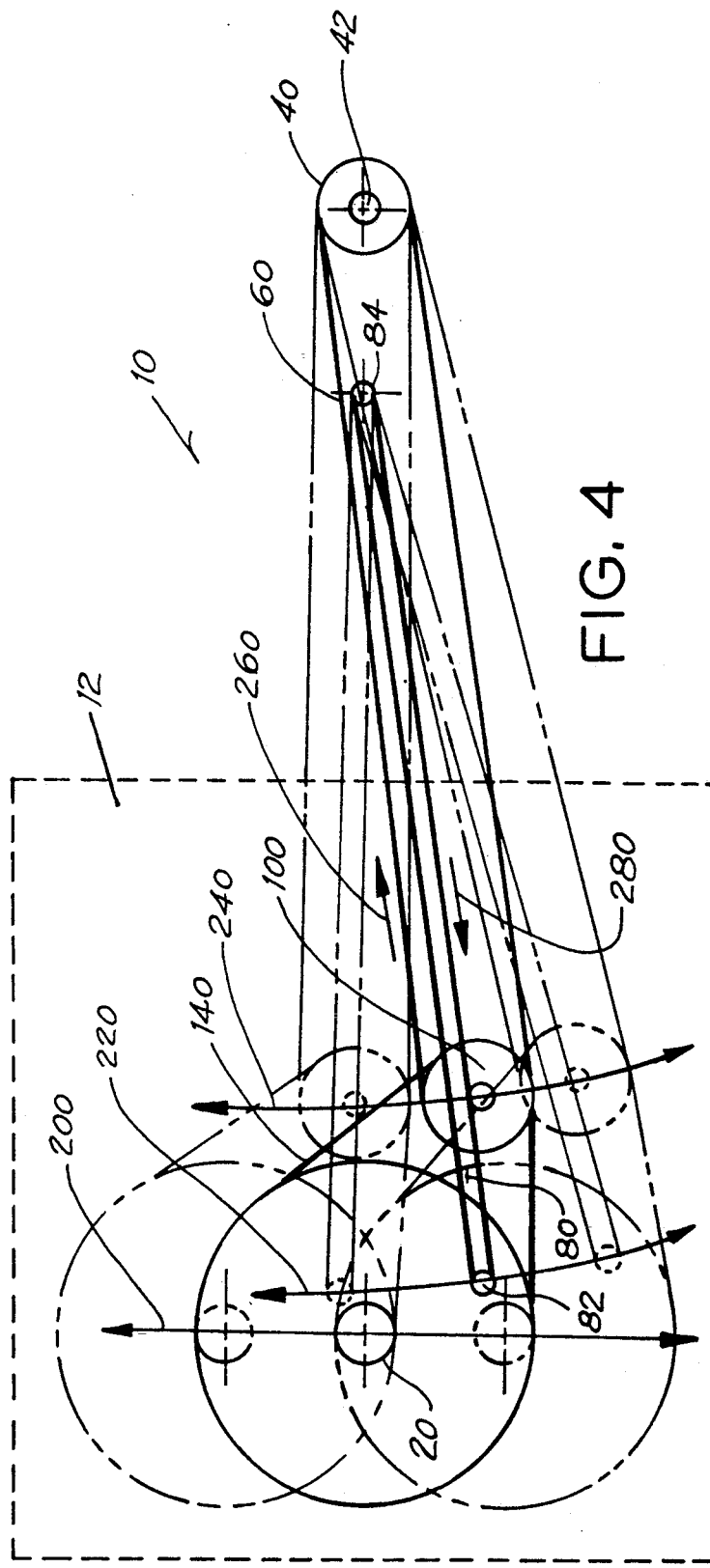

CHAIN DRIVE SYSTEM FOR VEHICLES

BACKGROUND OF THE INVENTION

Currently operating in the United States is a class of small race cars which incorporates motorcycle engines for propulsion and chain drive systems for power transmission. This basic power transmission set-up has two major drawbacks: First, the geometry of the chassis suspension causes vertical movement of the driven axle. This results in the drive chain being subjected to continual slackening and tightening cycles as the vehicle travels over the road or track. This causes the chain to suffer fatigue and stretch which can result in failure of the chain or make the chain very susceptible to derailing. Second, if the first condition is corrected by modifying the suspension geometry of the chassis to follow a nonslackening arc then the movement of the wheel base, the distance between the front axle and the rear axle, is adversely affected to cause lengthening and shortening of the wheel base as the car travels. This adversely affects the handling of the vehicle.

As noted previously a slack chain is very susceptible to derailing. This is especially true at the high rotational speeds involved in auto racing. Previously the problem of derailing was addressed by use of a spring loaded idler sprocket. This allowed proper chain tension to be maintained with the desired vertical suspension geometry. This works but it absorbs horsepower, a serious drawback in a racing vehicle, and still the spring idler may be overwhelmed at high speeds with resulting chain derailments. Also, all the driving force or chain tension must be reacted to by the suspension system. This can lead to a binding condition which is very detrimental to the handling of a race car.

Further, an additional problem with the current drive systems is that the chassis and the drive sprocket have a tendency to roll and move vertically with respect to the driven axle. This causes the two sprockets to be out of plane, adds to chain bind, and is an additional cause of chain derailing.

Finally, the presently used geometry of small chain driven racing cars is such that it is impossible to run a chain at the center of the car because a straight line path there would take the chain where the driver's seat must be. Accordingly, the chain has had to be to one side of the driver. That in turn means that the spring loaded mount for the chain tightening idler sprocket causes the sprocket to tilt on its edge as it moves up and down in an arc. This can, by itself, cause chain mis-alignment which causes the chain to jump off one or more of the sprockets. In addition, as was previously noted, there is a drag from the chain tightening sprocket, which is increased by mis-alignment between that sprocket and the path of the chain which affects the transmission of power from the engine to the wheels.

It is the objective of my present invention to overcome this problems by means of my unique and simple design which is disclosed herein. I know of no other structure or design which either teaches or shows the device of my invention. For example, U.S. Pat. No. 649,689 (Gay) shows a rear wheel that can move vertically on a leaf spring and it shows a sprocket system having two chains and an intermediate idler sprocket. The idler sprocket is spaced from the axle by a link Q' and it is spaced from the chassis by a link M' (which appears to be incorrectly located). These are different from my present invention in that the placement of strut or link M' will not function to keep the drive chain J at the proper tension. Furthermore, strut M' is connected to the hub of the intermediate sprocket rather than being connected in the manner and location of my present invention so that the geometry of my invention is different and more effective. U.S. Pat. No. 2,800,188 merely shows a system of multiple chains and sprockets without my structure. U.S. Pat. No. 2,927,480 shows a multiple drive with a link 57 controlling the position of the intermediate shaft but it does not teach my present invention and lacks the tensioning strut of the present invention. U.S. Pat. No. 2,479,617 likewise shows a dual chain drive with an intermediate sprocket but the entire assemblage is inside a rigid housing. A fixed adjustment for chain tension is shown. U.S. Pat. No. 4,328,877 is somewhat relevant in that the arrangement of this multiple chain drive does permit the wheel to move without slackening the chain but a very different suspension is shown. U.S. Pat. No. 1,168,934 discloses a multiple chain drive but the axle is fixed.

It is the objective of the present invention to provide a geometry which allows vertical movement of the driven axle while preventing the drive chain from being subjected to continual slackening and tightening cycles as the vehicle travels over the road or track.

It is a further objective of the present invention to allow the vehicle to move freely around any designed in shortcomings of the vehicle in which it is installed without chain bind.

It is a further objective of the present invention to prevent slackening and derailment of the chain with absorbing little or no horsepower or causing a binding of the chain.

Finally, it is an objective of the present invention to allow the chassis and the drive sprocket to roll and move vertically with respect to the driven axle by minimizing the angularity change of a normal big sprocket to small sprocket final drive system. This plane may now be on the centerline, under the driver, because my new geometry permits it or anywhere in the vehicle that it is desired.

SUMMARY OF THE INVENTION

The present invention solves the above noted problems by dividing the drive chain into two separate chain parts. The first chain extends from the motor to an intermediate or idler sprocket. The second chain extends from the intermediate or idler sprocket to the driven axle sprocket. The second chain extends downwardly at a substantial angle from the driven axle to the intermediate sprocket and the intermediate sprocket is supported on a mounting member which pivots around the same axis as the driven axle itself.

The first chain is kept at the desired tension by a strut, also referred to as the thrust strut or link, pivotally attached at the engine end to the chassis of the vehicle and at the intermediate sprocket end to the mounting of the intermediate sprocket by the thrust link connection. Consequently, the strut is pivotally attached at both of its ends. Essentially, this strut forms one of the long side of a parallelogram linkage. The first short side of the parallelogram linkage is the distance between the pivot point, located at the engine end, of the strut on the chassis to the engine sprocket. The second long side of the parallelogram is the first drive chain itself. The second short side of the parallelogram linkage is the distance between the thrust link and the place where the primary chain engages the intermediate or idler sprocket.

Because the single drive chain of the prior art has become two drive chains, whose angle can change with respect to one another without changing the length of either chain, it is now possible for the axle to move in a direction which is purely vertical without changing the length of either drive chain, but merely the angle between them; similar to the way the distance between the hand and the shoulder of a human arm can be changed by bending at the elbow. At the same time, because the path of the drive chain is no longer a straight line, it is possible to run the drive chain along the center line of the vehicle rather than along the side of the vehicle, because it can now extend under the driver's seat. This leads to very great improvements in the geometry of the drive. Everything stays in a nearer to vertical plane and there is practically no tendency to throw chains off of sprockets.

Accordingly, the invention may be summarily described structurally as chain drive assembly, for a vehicle having an engine for providing power, a drive axle including a sprocket, and a chassis, comprising a first chain drive for drivably connecting an idler sprocket to the engine; a second chain drive for driveably connecting the idler sprocket to a driven axle sprocket and extending at an angle to the first chain drive; and a strut or thrust link for maintaining the tension of the first chain drive. The strut being generally parallel to the first chain drive.

The strut or thrust link also preventing rotation of the chain drive assembly around the driven axle.

These and other benefits of the present invention will be apparent to one skilled in the art from the following description.

DESCRIPTION OF THE DRAWINGS

FIG. 1 is a top plan view of the present invention.

FIG. 2 is a side plan view of the present invention.

FIG. 3 is a top view of the present invention showing the parallelogramatic relationship of the chains and thrust link or strut of the present invention.

FIG. 4 is a schematic side view of the present invention showing the arcs of movement and the directions of force of the components of the present invention.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention 10 solves the previously noted problems of preexisting chain drives with a minimum of added complexity, cost, and weight. Additionally, the design offers another feature that is desirable in race car operation, that being the ease of changing final drive ratios without readjustment of the drive axle suspension linkage.

Referring to FIG. 4 the mechanics of motion of the present invention 10 are illustrated as follows: Reference number 200 indicates the path of vertical travel of axle 20 do to the suspension geometry. Reference numeral 220 indicates the arc of travel of thrust link 80. Reference numeral 240 indicates the arc of travel of the idler sprocket 100 at the end of primary chain 60. Reference numeral 260 indicates the direction of the tension force of the primary chain 60. Reference numeral 280 indicates the compression reaction of the thrust link 80.

Still referring to FIG. 4, it may be seen that the tension force 260 of the primary chain 60 is reacted in compression back to thrust link chassis mount 160 by the thrust link 80. This removes all chain pull from the drive axle suspension system of the vehicle. Further, no chain slack and tensioning system, other than the thrust link 80 itself, is required as the positioning of the thrust link pivot points 82 and 84 repositions idler sprocket 100 so as to generate the constant distance arc 220 about center 42 of transmission sprocket 40. This is accomplished because the design of the present invention 10 allows a rocking motion of the center section assembly 12 which carries the drive axle 20 and axle sprocket 120 in a fixed relationship with the idler sprocket 100 to the axle sprocket 120. Again, this relationship is at a fixed distance from the center 42 which again eliminates any need for a chain slack and tensioning system. Because of the lower positioning of the idler sprocket 100 the first chain 60 can be run at or near the center of the chassis, under the driver's seat, rather than at the side of the chassis, thus minimizing out of plane translation of the primary chain 60 and sprockets 40 and 100 due to vertical roll and travel of the suspension.

Referring now to FIG. 2 the complete unit 10 may be seen as it would be installed in a race car chassis; the center section assembly 12 is comprised of two parallel side plates 170 which are located on the axle 20 and the splined axle sprocket hub 180, the idler sprocket 100 and the thrust link mounting pad 162 in their proper positions. Also shown is brake caliper 14 which is mounted to the center section assembly 12 along with its rotor disk 16.

Still referring to FIG. 2 but also to FIGS. 1 and 3, the idler sprocket shaft 102 is contained in two eccentric mounts 190 which can be rotated for secondary slack adjustment. Final drive ratio changes are accomplished by changing the axle sprocket 120 with another sprocket of more or fewer teeth. Initial secondary chain slack adjustment is accomplished by adding or removing chain links with final adjustment by use of the eccentric mounts 190 of the idler sprocket 100. The initial slack adjustment of the primary or first chain 60 is accomplished by adding or removing chain links. The final slack adjustment to the entire assembly 10 is made by adjusting the length of thrust link 80 with the threaded spherical thrust link ends 86.

The axle 20 has splines 22 to accept a like splined axle sprocket hub 180 thus allowing the center section assembly 12 to be positioned laterally in the car chassis as desired.

The foregoing is considered as illustrative only of the principles of the invention. Furthermore, since numerous modifications and changes will readily occur to those skilled in the art, it is not desired to limit the invention to the exact construction and operation shown and described.

What is claimed is:

1. A chain drive assembly for a vehicle having an engine means for providing power, a drive axle including a sprocket, a driven axle and a chassis, the chain drive assembly comprising:

a first chain means for drivably connecting an idler sprocket to the engine means;

a second chain means for driveably connecting the idler sprocket to a driven axle sprocket and extending at an angle to the first chain means;

strut means for maintaining the tension of the first chain;

said strut means being generally parallel to said first chain means.

2. The chain drive assembly of claim 1 in which the strut means also prevents rotation of the chain drive assembly around the driven axle.

3. The chain drive assembly of claim 1 in which the angle between the first and second chain means is an obtuse angle.

4. A chain drive assembly for a vehicle having an engine means for providing power, a drive axle including a sprocket, a driven axle, and a chassis, the chain drive assembly comprising:

a first drive chain extending at an angle to a desired drive direction to an intermediate drive sprocket;

a second drive chain extending from the intermediate drive sprocket to a driven axle sprocket at a different angle to the desired drive direction which places the driven axle sprocket on the desired drive direction line;

and mounting means for the first drive chain and for the second drive chain which maintain the tension of said first drive chain while permitting the angle between the first drive chain and the second drive chain to change at the intermediate drive sprocket.

5. The chain drive assembly of claim 4 in which the mounting means for the first drive chain is a strut of adjustable length pivoted at one end on the chassis near the engine means and at the other end to a mounting for the intermediate sprocket whereby to form a support parallelogram in which the strut is one of the parallel members and the first drive chain is the other.

6. The chain drive for a vehicle of claim 4 in which the second drive chain and the intermediate sprocket are supported on a mounting which is pivoted on an axis concentric with the drive axle whereby to maintain the length of the secondary drive chain while permitting it to pivot in a vertical plane extending through the driven sprocket at the axle.

* * * * *